(12) United States Patent
Imasaka et al.

(10) Patent No.: US 6,793,052 B2
(45) Date of Patent: Sep. 21, 2004

(54) TORQUE CONVERTER

(75) Inventors: Masafumi Imasaka, Shizuoka (JP); Seiji Makita, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 10/349,190

(22) Filed: Jan. 23, 2003

(65) Prior Publication Data

US 2004/0026201 A1 Feb. 12, 2004

(30) Foreign Application Priority Data

| Jan. 24, 2002 | (JP) | ........................................ | 2002-016007 |
| Jan. 24, 2002 | (JP) | ........................................ | 2002-016008 |
| Feb. 25, 2002 | (JP) | ........................................ | 2002-048646 |
| Mar. 27, 2002 | (JP) | ........................................ | 2002-088613 |
| Mar. 27, 2002 | (JP) | ........................................ | 2002-088614 |

(51) Int. Cl.$^7$ ............................ F16H 41/24; F16H 45/02
(52) U.S. Cl. ............................ 192/3.23; 60/339; 60/345; 60/346; 192/110 B
(58) Field of Search ............................ 192/3.23, 3.28, 192/3.32, 57, 110 B; 277/433; 60/339, 341, 345, 346

(56) References Cited

U.S. PATENT DOCUMENTS 3,952,508 A * 4/1976 Bopp ........................ 60/339
5,344,162 A * 9/1994 Kernon et al. ............... 277/433
6,386,067 B1 * 5/2002 Inoue et al. ................. 74/730.1
6,484,854 B2 * 11/2002 Yoshimoto et al. ........... 60/345

FOREIGN PATENT DOCUMENTS

| JP | 2001-141025 A | * | 5/2001 |
| JP | 2001-241530 | | 9/2001 |

* cited by examiner

Primary Examiner—Rodney H. Bonck
(74) Attorney, Agent, or Firm—Arent Fox PLLC

(57) ABSTRACT

In a torque converter in which a radial bearing and a one-way clutch are disposed adjacent and concentrically with each other between a hub of a side cover and a turbine shaft extending through the hub, and a hub of an output gear is coupled to an outer end of the turbine shaft, an inner peripheral surface of the hub of the side cover is comprised of a larger-diameter inner peripheral surface portion located on the side of its base end, and a smaller-diameter inner peripheral surface portion located on the side of its tip end and connected to the larger-diameter inner peripheral surface portion through an annular step, and an outer race of the radial bearing fitted to the larger-diameter inner peripheral surface portion is clamped by the annular step and a retaining ring locked to the larger-diameter inner peripheral surface portion.

15 Claims, 12 Drawing Sheets

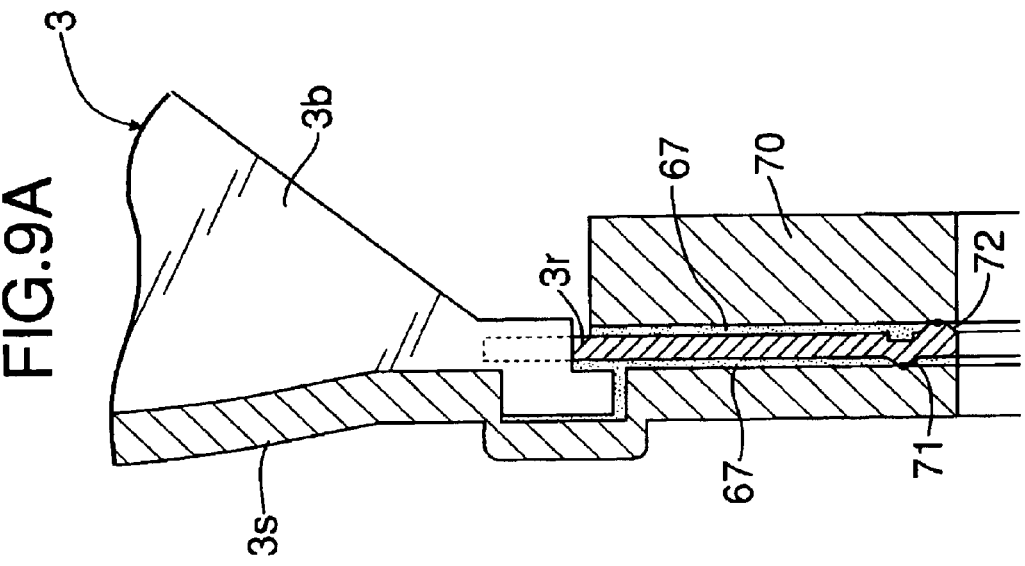
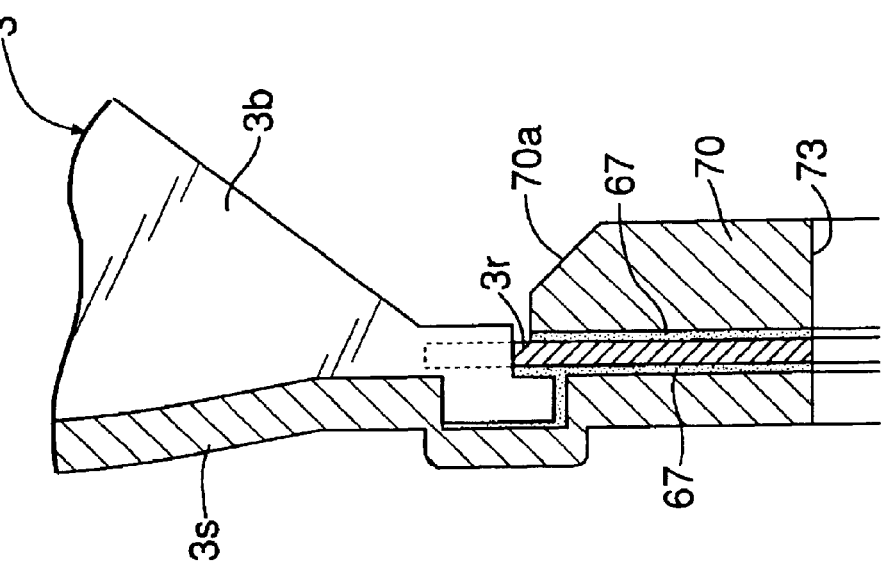

TORQUE CONVERTER

BACKGROUND OF THE INVENTION

1. Field of the Invention

The present invention relates to an improvement in a torque converter comprising: a pump impeller connected to an input shaft; a turbine impeller which is mounted to oppose the pump impeller and to which a turbine shaft is connected; and a side cover integrally connected to the pump impeller to cover the turbine impeller; a radial bearing for concentrically retaining a hub of the side cover and the turbine shaft as well as a one-way clutch being disposed adjacent each other between the hub of the side cover and the turbine shaft extending through the hub, the one-way clutch being adapted to connect the turbine shaft and the side cover to each other when a reverse load is applied to the turbine shaft; a hub of an output gear being coupled to an outer end of the turbine shaft; a sealing means being mounted between the hubs of the output gear and the side cover.

2. Description of the Related Art

Such a torque converter is already known, as is disclosed in Japanese Patent Application Laid-open No. 2001-241530.

In such torque converter, when a reverse load is transmitted from the output gear to the turbine shaft during deceleration of a vehicle, the one-way clutch connects the turbine shaft and the side cover directly to each other. Therefore, the reverse load is transmitted from the turbine shaft directly to the side cover, and further from the pump impeller to a crankshaft, whereby a good engine brake effect can be obtained without occurrence of a slipping between the turbine impeller and the pump impeller. Moreover, the radial bearing adjoining the one-way clutch is interposed between the turbine shaft and the hub of the side cover to ensure the concentricity between them. Therefore, loads received by clutch elements such as sprags of the one-way clutch between the turbine shaft and the side cover can be equalized, thereby improving durability of the clutch. In addition, a working oil within the torque converter can be prevented by the sealing means from being leaked from an inner peripheral surface of the hub of the side cover.

In the conventionally known torque converter, the one-way clutch and the radial bearing are disposed on opposite sides of an annular projection formed at an intermediate portion of the inner peripheral surface of the hub of the side cover, and an outer race of the radial bearing is clamped axially by the annular projection and a retaining ring locked to the inner peripheral surface of the hub of the side cover in order to retain the bearing. Therefore, the formation of the inner peripheral surface of the hub of the side cover is obliged to be conducted from axially opposite ends of the hub due to the presence of the annular projection at the intermediate portion of the inner peripheral surface, and hence, the number of steps is larger, and it is difficult to reduce the cost.

SUMMARY OF THE INVENTION

Accordingly, it is an object of the present invention to provide a torque converter of the above-described type, wherein the entire inner peripheral surface of the hub of the side cover can be formed from the side of an inner end, whereby the retaining of the radial bearing can be conducted simply, while providing a reduction in the number of steps, and in turn a reduction in cost.

To achieve the above object, according to a first feature of the present invention, there is provided a torque converter comprising: a pump impeller connected to an input shaft; a turbine impeller which is mounted to oppose the pump impeller and to which a turbine shaft is connected; and a side cover integrally connected to the pump impeller to cover the turbine impeller; a radial bearing for concentrically retaining a hub of the side cover and the turbine shaft as well as a one-way clutch being disposed adjacent each other between the hub of the side cover and the turbine shaft extending through the hub, the one-way clutch being adapted to connect the turbine shaft and the side cover to each other when a reverse load is applied to the turbine shaft; a hub of an output gear being coupled to an outer end of the turbine shaft; a sealing means being mounted between the hubs of the output gear and the side cover, wherein an inner peripheral surface of the hub of the side cover is formed into a stepped configuration by a larger-diameter inner peripheral surface portion located on the side of its base end and a smaller-diameter inner peripheral surface portion located on the side of its tip end and connected to the larger-diameter inner peripheral surface portion through an annular step; an outer race of the radial bearing fitted to the larger-diameter inner peripheral surface portion being clamped axially by the annular step and a retaining ring locked to the larger-diameter inner peripheral surface portion; and the hub of the output gear is relatively rotatably fitted to the smaller-diameter inner peripheral surface portion with the sealing means mounted between their fitted surfaces.

With the first feature, the inner peripheral surface of the hub of the side cover is formed into the stepped configuration by the larger-diameter inner peripheral surface portion which is located on the side of its base end and on which the radial bearing and the one-way clutch are mounted, and the smaller-diameter inner peripheral surface portion located on the side of its tip end. Therefore, the entire stepped inner peripheral surface can be formed at a stroke, leading to a decrease in steps and a reduction in cost.

Moreover, the annular step between the larger-diameter inner peripheral surface portion and the smaller-diameter inner peripheral surface portion is utilized for axially retaining the outer race of the radial bearing and hence, the retaining structure is simple, and a further reduction in cost can be provided.

Furthermore, the first sealing means is mounted between the smaller-diameter inner peripheral surface portion and the hub of the output gear relatively rotatably fitted to the smaller-diameter inner peripheral surface portion, and hence, the diameter of the first sealing means can be reduced, and a load on the first sealing means can be alleviated, leading to an enhancement in durability thereof.

According to a second feature of the present invention, in addition to the first feature, the sealing means is comprised of an annular sealing groove defined in an outer peripheral surface of the hub of the output gear, and a seal ring mounted in the sealing groove to come into resilient close contact with the smaller-diameter inner peripheral surface portion, so that the force of close contact of the seal ring with the smaller-diameter inner peripheral surface portion is increased by a centrifugal force applied to the seal ring.

With the second feature, the force of close contact of the seal ring with the smaller-diameter inner peripheral surface portion is increased in accordance with an increase in rotational speeds of the hub of the side cover and the output gear, and it is possible to effectively prevent the leakage of an internal pressure rising during rotation of the torque converter at a high speed.

According to a third feature of the present invention, in addition to the second feature, the seal ring is comprised of a resilient ring member which has a single abutment and which is provided with such a radial tension that it has a diameter larger than that of the smaller-diameter inner peripheral surface portion in its free state, an end face of the seal ring facing the abutment being inclined with respect to an axis or a radius line of the ring.

With the third feature, the mounting of the hub of the output gear in the sealing groove can be conducted easily by widening the abutment and moreover, the force of close contact of the seal ring with the smaller-diameter inner peripheral surface portion can be increased reliably in accordance with increases in rotational speeds of the hub of the side cover and the output gear.

In addition, since the end face of the seal ring facing the abutment is inclined with respect to the axis or radius line of the ring, the leakage of a working oil from the abutment can be minimized.

According to a fourth feature of the present invention, in addition to any of the first to third features, the output gear is comprised of the hub fitted to the turbine shaft and to the hub of the side cover, an arm extending radially from an outer periphery of the hub at one end thereof, and a toothed rim extending axially to overhang from an outer peripheral end of the arm toward the side cover, so that an annular recess is defined between the rim and the hub, and wherein the outer peripheral surface of the hub of the side cover is comprised of a larger-diameter portion located on the side of its base end and having a diameter substantially equal to that of the annular recess, and a smaller-diameter portion located on the side of its tip end, the smaller-diameter portion being disposed in the annular recess, the larger-diameter portion being disposed outside the annular recess, a corner of the annular recess on the side of the rim being rounded.

With the fourth feature, the smaller-diameter portion of the hub of the side cover is disposed in the annular recess of the output gear and hence, the axial compactness of the torque converter can be achieved, while ensuring a sufficient width of the toothed rim.

Moreover, although the annular recess and the larger-diameter portion of the hub of the side c over are formed to have the substantially equal diameters, the rounded shape having a large curvature radius can be provided to the corner of the annular recess on the side of the rim without being interfered by the larger-diameter portion, and hence it is possible to avoid the concentration of a stress at the corner to contribute to an enhancement in durability of the output gear.

The hub of the side cover comprised of the larger-diameter portion on the side of its base end and the smaller-diameter portion on the side of its tip end has a rational wall thickness corresponding to a load, and thus a reduction in weight and strength can be satisfied.

According to a fifth feature of the present invention, in addition to the first feature, the turbine shaft is lightly press-fitted into the hub of the output gear, and their fitted faces are beam-welded to each other over the entire periphery at outer end faces of the hub and the turbine shaft.

With the fifth feature, the turbine shaft is lightly press-fitted into the hub of the output gear and hence, a relatively small load suffices for such press-fitting, and even if the hollow turbine shaft is not especially of a larger wall thickness, deformation of the turbine shaft due to the press-fitting can be minimized. Moreover, the lightly press-fitted portions are coupled firmly to each other over the entire periphery by the beam-weld zone and hence, the lack of the coupling strength of the turbine shaft and the output gear due to the light press-fitting can be sufficiently compensated for, and the sealing of the lightly press-fitted portions can be also achieved reliably. Furthermore, a relatively small heat input suffices for the beam welding and hence, the thermal deformation of various portions due to the heat input is excluded.

According to a sixth feature of the present invention, in addition to the fifth feature, an outer peripheral surface of the turbine shaft is formed with a larger-diameter portion located on the side of its base end, and a smaller-diameter portion connected to the larger-diameter portion through an annular step, and the one-way clutch is fitted to the larger-diameter portion, while an inner race of the radial bearing is fitted to the smaller-diameter portion and clamped axially by the annular step and the hub of the output gear fitted to the smaller-diameter portion.

With the sixth feature, the inner race of the radial bearing can be retained simply without use of a special retaining ring. Moreover, the depth of press-fitting between the hub of the output gear and the turbine shaft can be defined easily and correctly by putting the hub of the output gear into abutment against the annular step with the inner race of the radial ball bearing interposed therebetween.

According to a seventh feature of the present invention, in addition to the sixth feature, the annular step has a tapered face formed at its outer peripheral edge for guiding the fitting of the one-way clutch to the larger-diameter portion.

With the seventh feature, the one-way clutch can be mounted easily on the larger-diameter portion of the turbine shaft by the guiding function of the tapered face without being obstructed by the annular step, thereby contributing to an enhancement in assemblability.

According to an eighth feature of the present invention, in addition to the first feature, a stator impeller disposed between the pump impeller and the turbine impeller is made of a light alloy; an outer peripheral surface of a sleeve made of a steel is integrally coupled to an inner peripheral surface of a hub of the stator impeller; and a hollow stator shaft relatively rotatably carried on an outer periphery of an input shaft is spline-coupled to an inner periphery of the sleeve.

With the eighth feature, the weight of the stator impeller can be reduced by forming it from the light alloy, and the durability of coupled portions of the stator impeller and stator shaft can be enhanced by spline-coupling the stator shaft to the sleeve made of the steel.

According to a ninth feature of the present invention, in addition to the eighth feature, the sleeve is press-fitted to the inner peripheral surface of the hub.

With the ninth feature, the sleeve can be thermally treated independently before being press-fitted into the hub, and thus a desired durability can be provided easily to the sleeve irrespective of casting of the stator impeller.

According to a tenth feature of the present invention, in addition to the ninth feature, the hub of the stator impeller has a smaller-diameter inner peripheral surface portion and a larger-diameter inner peripheral surface portion formed thereon with a central partition wall interposed therebetween; the sleeve is press-fitted to the smaller-diameter inner peripheral surface portion; one side of an inner race of a ball bearing for supporting the turbine impeller on the outer periphery of the stator shaft is put into abutment against an outer end face of the sleeve; a portion of the hub of the pump impeller is disposed within the larger-diameter inner peripheral surface portion; a thrust bearing having a thrust plate is interposed between the hub and the partition wall with the thrust plate put into abutment against the partition wall; and the axial position of the stator impeller is defined by the ball bearing and the thrust bearing.

With the tenth feature, a thrust load generated on the stator impeller is supported by the ball bearing through the sleeve made of the steel and by the thrust plate of the thrust bearing through the partition wall, whereby the durability of the hub made of the light alloy against the thrust load can be enhanced. In addition, since a portion of the hub of the pump impeller is disposed along with the thrust bearing within the larger-diameter inner peripheral surface portion of the hub of the stator impeller, the amount of outward protrusion of the hub can be decreased to contribute to the compactness of the torque converter.

According to an eleventh feature of the present invention, in addition to the tenth feature, the inner race of the ball bearing is formed to have a wall thickness larger than that of an outer race of the ball bearing, so that an area of abutment of the inner race against the sleeve is increased.

With the eleventh feature, the area of abutment of the inner race against the sleeve can be increased by forming only the inner race of the ball bearing with the large wall thickness, while minimizing an increase in diameter of the ball bearing, whereby the surface pressure on the inner race and the sleeve can be decreased, leading to an enhancement in durability.

According to a twelfth feature of the present invention, in addition to the first feature, a pair of radial needle bearings are interposed between a stator shaft connected to a stator impeller disposed between the pump impeller and the turbine impeller as well as an input shaft extending through the stator shaft, and support opposite ends of the stator shaft for rotation; a freewheel is interposed between an outer tube formed at an outer end of the stator shaft and an inner tube relatively rotatably supported on the input shaft and non-rotatably supported on a stationary structure and disposed concentrically within the outer tube; a radial needle bearing is interposed between the input shaft and the inner tube, the radial needle bearing being located adjacent the radial needle bearing located at the outer end of the stator shaft and comprising a needle roller having a diameter larger than that of the radial needle bearing located at the outer end of the stator shaft.

With the twelfth feature, the radial needle bearing on the inner tube and the radial needle bearing at the outer end of the stator shaft cannot enter the bearing housing of the other because of a difference between the diameters of the needle rollers and thus, a reduction in durability thereof due to the mutual interference can be prevented. Moreover, since the needle roller of the radial needle bearing on the inner tube has the diameter larger than that of the radial needle bearing at the outer end of the stator shaft, the durability of the radial needle bearing on the inner tube can be enhanced further and hence, can endure the high relative rotation between the input shaft and the inner tube sufficiently.

According to a thirteenth feature of the present invention, in addition to the twelfth feature, a flat washer is interposed between both the radial needle bearings adjoining each other.

With the thirteenth feature, the interference between the radial needle bearings adjoining each other can be prevented more reliably by the flat washer.

According to a fourteenth feature of the present invention, in addition to the first feature, a circulation circuit for a working oil is defined by the pump impeller, the turbine impeller and a stator impeller disposed between the pump impeller and the turbine impeller; a stator shaft rotatably supported on the input shaft through first and second inner periphery-side radial bearings arranged axially is connected at its inner end to the stator impeller; the turbine shaft is rotatably supported on the stator shaft with an outer-periphery side radial bearing interposed therebetween; a freewheel is interposed between an outer end of the stator shaft and a stationary structure; the input shaft is provided with an inlet bore for permitting the working oil to flow into the circulation circuit and an outlet bore for permitting the working oil to flow out of the circulation circuit; an inner end of the outer-periphery side radial bearing is in communication with the circulation circuit; and a sealing means is provided between opposed peripheral surfaces of the turbine shaft and the stator shaft axially outside the outer-periphery side radial bearing.

With the fourteenth feature, the outer-periphery side radial bearing can be lubricated by the working oil in the circulation circuit, and the leakage of the oil from the outer-periphery side radial bearing to the outside can be prevented by the sealing means. Therefore, even if the capacity of an oil pump for supplying the working oil to the circulation circuit C is not particularly increased, the lack of the amount of the working oil supplied to the circulation circuit cannot be brought about, and the torque converter can exhibit a desired transmitting performance.

According to a fifteenth feature of the present invention, in addition to the fourteenth feature, the inlet bore is brought into communication with the circulation circuit through the first inner periphery-side radial bearing at the inner end of the stator shaft, and an annular oil sump and a pair of annular constrictions axially sandwiching the annular oil sump are provided between the first and second inner periphery-side radial bearings and between opposed peripheral surfaces of the input shaft and the stator shaft, the annular oil sump being in communication with the outer-periphery side radial bearing through a transverse bore provided in the stator shaft.

With the fifteenth feature, the working oil can lubricate the first inner periphery-side radial bearing in the middle of flowing from the inlet bore in the input shaft toward the circulation circuit, and a portion of the working oilcan be appropriately supplied through one of the annular constrictions adjoining the first inner periphery-side radial bearing. The working oil which has exited from the circulation circuit and has lubricated the outer-periphery side radial bearing can be appropriately supplied from the annular oil sump through the other annular constriction not only to the second inner periphery-side radial bearing but also to the freewheel to lubricate them.

The above and other objects, features and advantages of the invention will become apparent from the following description of the preferred embodiment taken in conjunction with the accompanying drawings.

BRIEF DESCRIPTION OF THE DRAWINGS

FIGS. 9A and 9B are views for explaining a process of producing a turbine impeller;

DESCRIPTION OF THE PREFERRED EMBODIMENT

The present invention will now be described by way of a preferred embodiment with reference to the accompanying drawings.

Figure 1:
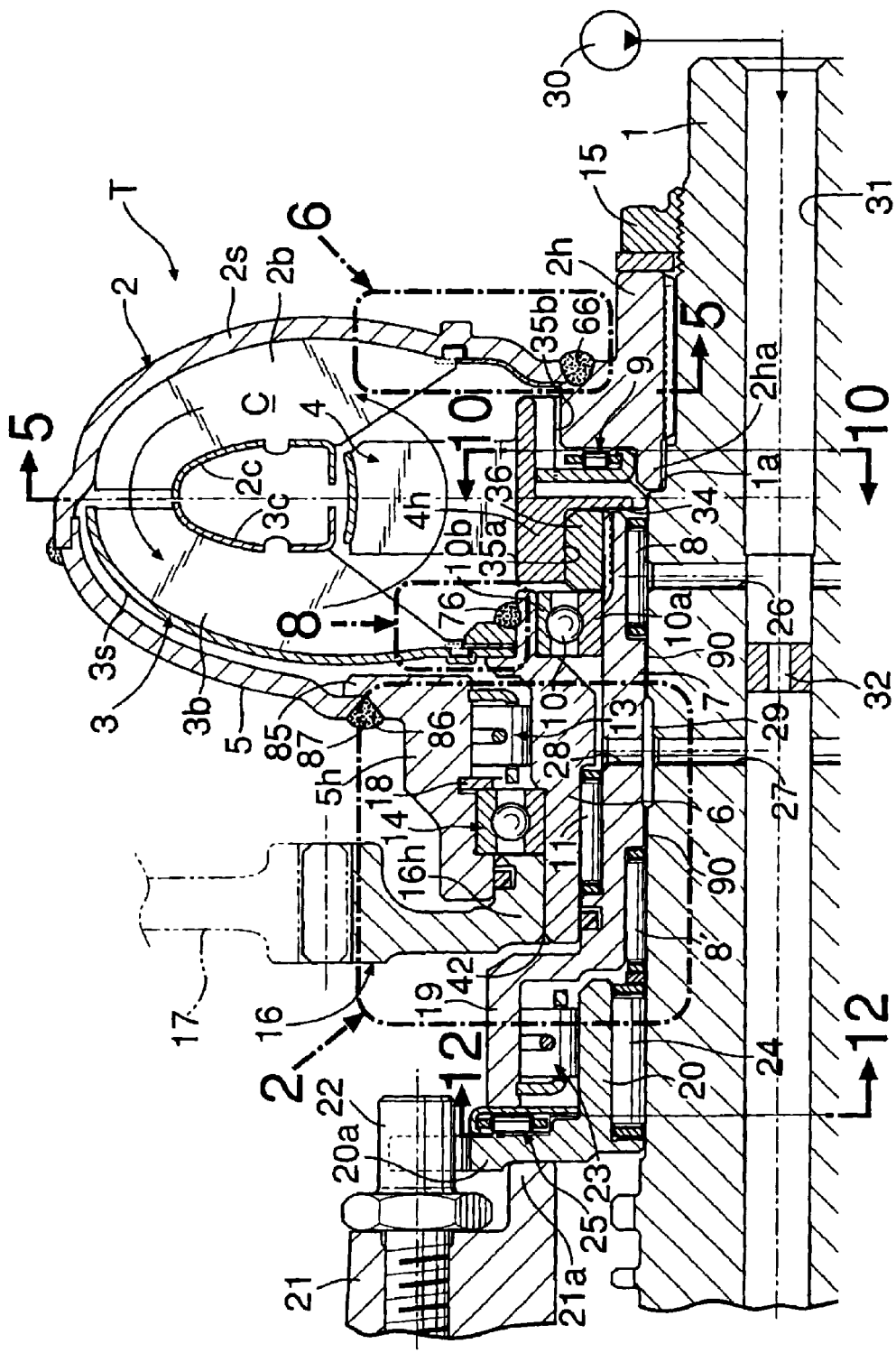
FIG. 1 is a vertical sectional view of a torque converter according to the present invention.

Referring first to FIG. 1, a torque converter T as a fluid transmitting device mounted on a small-sized vehicle such as a motorcycle, a buggy car and the like is interposed between a crankshaft 1 of an engine as an input shaft and a driven gear 17 of a multi-stage auxiliary transmission. The torque converter T includes a pump impeller 2, a turbine impeller 3 mounted with its outer periphery opposed to an outer periphery of the pump impeller 2, and a stator impeller 4 disposed between inner peripheries of the pump impeller 2 and the turbine impeller 3. A circulation circuit C for transmitting a power by a working oil is defined among the three impellers 2, 3 and 4. A side cover 5 is integrally connected to the pump impeller 2 by welding to cover an outer surface of the turbine impeller 3. The pump impeller 2 has a hub 2h spline-fitted over the crankshaft 1 and clamped by an annular shoulder 1a around an outer periphery of the crankshaft 1 and a nut 15 threadedly fitted over the crankshaft 1. In this manner, the pump impeller 2 is secured to the crankshaft 1.

The stator impeller 4 is made of a light alloy such as an aluminum alloy, and has a smaller-diameter inner peripheral face 35a and a larger-diameter inner peripheral face 35b formed on a hub 4h thereof with a central partition wall 34 interposed therebetween. A sleeve 36 made of a steel and press-fitted to the smaller-diameter inner peripheral face 35a is spline-coupled to an inner end of a hollow stator shaft 7 (made of a steel).

A reduction in weight of the impeller 4 can be achieved by making the stator impeller 4 from the light alloy, and the durability of coupled portions of the stator impeller 4 and the stator shaft 7 can be enhanced by spline-coupling the stator shaft 7 to the press-fitted sleeve 36 made of the steel. Namely, both the reduction in weight and durability of the stator impeller 4 can be satisfied.

The sleeve 36 made of the steel can be cast in the hub 4h when the stator impeller 4 is casted, but if a structure in which the sleeve 36 is press-fitted to the inner peripheral surface of the hub 4h of the stator impeller 4, as described above, is employed, the sleeve 36 can be subjected freely to a thermal treatment separately before being press-fitted into the hub 4h, and thus a desired durability can be provided easily to the sleeve 36, independently from the casting of the stator impeller.

Inner and outer ends of the hollow stator shaft 7 are carried on the crankshaft 1 with a pair of left and right radial needle bearings 8 and 8' interposed therebetween. A portion of the hub 2h of the pump impeller 2 is disposed within the larger-diameter inner peripheral face 35b, and a thrust plate-assembled thrust bearing 9 is interposed between the hub 2h and the partition wall 34. The thrust plate-assembled thrust bearing 9 will be described hereinafter in detail.

The turbine impeller 3 is fitted and welded to an inner end of a turbine shaft 6 surrounding the stator shaft 7, and the turbine shaft 6 is relatively rotatably carried on an outer periphery of the stator shaft 7 with a radial ball bearing 10 and a radial needle bearing 11 interposed therebetween. In this case, the radial ball bearing 10 is disposed at an inner end of the turbine shaft 6, and the radial needle bearing 11 is disposed at an outer end of the turbine shaft 6.

An outer end face of the sleeve 36 made of the steel and press-fitted to the smaller-diameter inner peripheral face 35a of the hub 4h of the stator impeller 4 protrudes from the hub 4h, and the radial ball bearing 10 is disposed, so that its inner race 10a is in abutment against the outer end face of the sleeve 36. The hub 4h of the stator impeller 4 is clamped by the turbine shaft 6 and the hub 2h of the pump impeller 2 with the radial ball bearing 10 and the thrust plate-assembled thrust bearing 9 interposed therebetween, whereby its axial position is defined.

The inner race 10a of the radial ball bearing 10 is formed to have a thickness larger than that of an outer race 10b in order to enlarge an area of abutment between the inner race 10a and the sleeve 36.

A thrust load generated on the stator impeller 4 is supported on the radial ball bearing 10 through the sleeve 36 made of the steel and on the thrust plate-assembled thrust bearing 9 through the partition wall 34 and hence, the durability of the hub 4h made of the light alloy against the thrust load can be enhanced. Especially, because the inner race 10a of the radial ball bearing 10 is formed to have the thickness larger than that of the outer race 10b, the area of abutment between the inner race 10a and the sleeve 36 can be enlarged, so that the surface pressure on the inner race 10a and the sleeve 36 is reduced, and thus, the durability against the thrust load can be enhanced.

Because the outer end face of the sleeve 36 abutting against the inner race 10a of the radial ball bearing 10 protrudes from the hub 4h of the stator impeller 4, an annular oil sump for permitting the outflow of the working oil from the circulation circuit C can be defined between the hub 4h and the outer race 10b of the bearing 10.

In addition, because a portion of the hub 2h of the pump impeller 2 is disposed along with the thrust plate-assembled thrust bearing 9 within the larger-diameter inner peripheral face 35b of the hub 4h of the stator impeller 4, the amount of outward protrusion of the hub 2h of the pump impeller 2 can be decreased to contribute to the compactness of the torque converter T.

A hub 5h surrounding the turbine shaft 6 is welded to the side cover 5. In this welding, an inner peripheral surface of the side cover 5 is fitted over a stepped portion of a stepped flange 85 formed at a base end of the hub 5h. An annular groove 86 having a trapezoidal or V-shaped section is defined in outer faces of the side cover 5 and the flange 85 with their fitted faces forming a groove bottom, and the side cover 5 and the flange 85 are TIG-welded or MIG-welded to each other in the annular groove 86. A weld zone is designated by reference numeral 87. If the side cover 5 and the flange 85 are welded in the above manner, the weld zone 87 extends in wide regions on the side cover 5 and the flange 85, whereby the welding strength can be increased.

A one-way clutch 13 and a radial ball bearing 14 are disposed axially adjacent each other, with the former located on the side of the stator impeller 4, between an inner peripheral surface of the hub 5*h* of the side cover 5 and an outer peripheral surface of the turbine shaft 6. A hub 16*h* of an output gear 16 for driving the driven gear 17 is coupled adjacent the outside of the radial ball bearing 14, and relatively rotatably fitted to the inner peripheral surface of the hub 5*h* of the side cover 5 with a first seal means 48 mounted between their fitted portions. These structures will be described in detail with reference to FIG. 2.

The hub 5*h* of the side cover 5 extends axially outwards from its base end welded to the side cover 5 to its tip end, and its inner peripheral surface is formed into a stepped configuration by a larger-diameter inner peripheral surface portion 37*a* on the side of the base end, and a smaller-diameter inner peripheral surface portion 37*b* on the side of the tip end, which is connected to an outer end of the larger-diameter inner peripheral surface portion 37*a* through an annular step 37*c*. The axial length of the inner peripheral surface portion 37*b* is set at a value as small as equal to or smaller than one half of the axial length of the larger-diameter inner peripheral surface portion 37*a*. The stepped inner peripheral surface is formed at a stroke from the side of the base end of the hub 5*h*. The larger-diameter inner peripheral surface portion 37*a* has a deep annular locking groove 40 provided at its central portion, and a shallow annular locking groove 40 provided at a location closer to the base end.

On the other hand, the turbine shaft 6 disposed inside the hub 5*h* of the side cover 5 protrudes at its tip end outwards from the hub 5*h*, and the outer peripheral surface of the turbine shaft 6 is comprised of a larger-diameter portion 39*a* on the side of its base end, and a smaller-diameter portion 39*b* on the side of its tip end, which is connected to the larger-diameter portion 39*a* through an annular step 39*c*. The annular step 39*c* is disposed at a location substantially corresponding to the deep annular locking groove 40 in the hub 5*h*. A tapered face 49 is formed at an outer peripheral edge of the annular step 39*c*.

The radial ball bearing 14 has an outer race 14*a* which is fitted to the larger-diameter inner peripheral surface portion 37*a* of the hub 5*h* of the side cover 5, and clamped axially by the annular step 37*c* and a retaining ring 18 locked in the deep annular locking groove 40. An inner race 14*b*, to which the smaller-diameter portion 39*b* of the turbine shaft 6 is fitted, is clamped axially by the annular step 39*c* of the turbine shaft 6 and the hub 16*h* of the output gear 16 fitted to an outer end of the smaller-diameter portion 39*b*.

An annular retainer 13*a* for the one-way clutch 13 is locked in the shallow annular locking groove 41 in the hub 5*h* of the side cover 5, and a large number of clutch elements 13*b* such as sprags retained on the retainer 13*a* are interposed between the larger-diameter inner peripheral surface portion 37*a* of the hub 5*h* and the larger-diameter portion 39*a* of the turbine shaft 6. When fitting the larger-diameter portion 39*a* to the one-way clutch 13, the tapered face 49 of the annular step 39*c* guides the fitting, and hence the mounting of the one-way clutch 13 can be carried out easily, irrespective of the presence of the annular step 39*c*. The one-way clutch 13 is constructed so that it is brought into a turned-on state to connect the turbine shaft 6 and the hub 5*h* of the side cover 5 directly to each other, when a reverse load is applied to the turbine shaft 6.

Referring again to FIG. 1, an outer tube 19 is integrally formed on the stator shaft 7 adjacent to an outer surface of the output gear 16, and an inner tube 20 disposed concentrically within the outer tube 19 is relatively rotatably fitted over the crankshaft 1 with a radial ball bearing 24 interposed therebetween. A freewheel 23 is interposed between the inner and outer tubes 20 and 19. The inner tube 20 has, at its one end, a flange 20*a* which is locked on a fixing pin 22 provided on a stationary structure 21 such as a crankcase, and which is supported at its outer end face on a positioning stopper 21*a* projectingly provided on the stationary structure 21. An end face of the outer tube 19 is supported by the flange 20*a* with a thrust plate-assembled thrust bearing 25 interposed therebetween.

A needle roller having a diameter larger than a needle roller of the radial needle bearing 8' at the outer end of the stator shaft 7 is used as the radial needle bearing 24 for the inner tube 20, in consideration of a load on the inner tube 20. A flat washer 33 is interposed between the radial needle bearings 8' and 24 adjoining each other.

The radial needle bearing 24 for the inner tube 20 and the radial needle bearing 8' at the outer end of the stator shaft 7 have different needle roller diameters and hence, cannot enter the bearing housing of the other. Therefore, it is possible to prevent a reduction in durability due to the mutual interference and to more effectively prevent the mutual interference by the flat washer 33 between the radial needle bearings 8' and 24. Moreover, because the needle roller of the radial needle bearing 24 for the inner tube 20 has the diameter larger than that of the radial needle bearing 8' at the outer end of the stator shaft 7, the durability thereof can be particularly enhanced to sufficiently endure the high relative rotation between the crankshaft 1 and the inner tube 20.

When the rotation of the crankshaft 1 is transmitted to the pump impeller 2 by the operation of the engine to rotate the pump impeller 2, the oil filling the circulation circuit C within the torque converter T transmits the rotational torque of the pump impeller 2 to the turbine impeller 3, while being circulated through the pump impeller 2, the turbine impeller 3, the stator impeller 4 and the pump impeller 2, as shown in by arrows in FIG. 1, thereby driving the output gear 16 from the turbine shaft 6. If there is a torque-amplifying action generated between the pump impeller 2 and the turbine impeller 3 at that time, the resulting reaction force is borne by the stator impeller 4, and the stator impeller 4 is supported on the fixing pin 22 by a locking action of the freewheel 23.

When the torque-amplifying action is ended, the stator impeller 4 is rotated in the same direction along with the pump impeller 2 and the turbine impeller 3, while racing the freewheel 23 by a reverse rotation in a direction of the torque received by the stator impeller 4.

When the reverse load is transmitted from the driving gear 16 to the turbine shaft 6 during deceleration of the vehicle, the one-way clutch 13 is brought into the turned-on state to connect the turbine shaft 6 and the side cover 5 directly to each other, and hence the reverse load is transmitted from the turbine shaft 6 directly to the side cover 5 and also transmitted from the pump impeller 2 to the crankshaft 1. Therefore, the slipping cannot occur between the turbine impeller 3 and the pump impeller 2 and thus, a good engine brake effect can be obtained.

Moreover, the radial ball bearing 14 adjoining the one-way clutch 13 is interposed between the turbine shaft 6 and the hub 5*h* of the side cover 5 to ensure the concentricity between them. Therefore, the loads received by the large number of clutch elements 13b of the one-way clutch 13 between the turbine shaft 6 and the hub 5h can be equalized, leading to an enhancement in durability of the clutch 13. The radial ball bearing 14 connects the turbine shaft 6 and the hub 5h of the side cover 5 by cooperation with the output gear 16 secured to the turbine shaft 6, and hence the assembly of the torque converter T can be constructed with a simple structure before being assembled to the crankshaft 1. Therefore, in the assembling of the torque converter T to the crankshaft 1, the axial positioning of the entire torque converter T can be achieved only by spline-fitting the hub 2h of the pump impeller 2 over the crankshaft 1 and securing it by the nut 15.

The coupling structure of the turbine shaft 6 and the output gear 16 will be described in detail with reference to FIG. 2.

The output gear 16 is comprised of the hub 16h, an arm 16a extending radially from an outer end of the hub 16h, and a toothed rim 16r extending axially to overhang from an outer peripheral end of the arm 16a toward the side cover 5. The smaller-diameter portion 39b of the turbine shaft 6 is lightly press-fitted to an inner peripheral surface of the hub 16h, and fitted faces of the hub 16h and the turbine shaft 6 are coupled to each other at outer end faces of the hub 16h and the turbine shaft 6 by welding using a laser beam or the like. Reference numeral 42 designates such a beam weld zone. The depth of press-fitting of the turbine shaft 6 to the inner peripheral surface of the hub 16h is defined easily and precisely by the abutting of the hub 16h against the annular step 39c with the inner race 14b of the ball bearing 14 interposed therebetween. In this manner, the output gear 16 is coupled to the turbine shaft 6, and at the same time the inner race 14b of the radial ball bearing 14 is retained axially by the annular step 39c and the hub 16h, leading to a simplified inner race-retaining structure.

Because the press-fitting of the turbine shaft 6 to the hub 16h of the output gear 16 is light, a relatively small press-fitting load suffices. Therefore, even if the hollow turbine shaft 6 does not have a particularly large thickness, the deformation of the turbine shaft 6 due to the press-fitting can be minimized. Moreover, the lightly press-fitted portion is coupled firmly over the entire periphery by the beam weld zone 42 formed by the laser or the like and hence, the lack of the strength of coupling of the turbine shaft 6 and the output gear 16 due to the light press-fitting can be compensated for sufficiently, and the sealing of the lightly press-fitted portion can be achieved reliably. In addition, a relatively small heat input suffices for the beam welding and hence, the thermal deformation of various portions due to the heat input is excluded.

In the output gear 16, an annular recess 43 having a diameter substantially equal to that of the larger-diameter portion 38a of the hub 5h of the side cover 5 is defined between the hub 16h and the rim 16r, a corner 43a of the annular recess 43 on the side of the rim 16r is rounded. The smaller-diameter portion 38b of the hub 5h of the side cover 5 is disposed within the annular recess 43, and the larger-diameter portion 38a of the hub 5h is disposed outside the annular recess 43. This makes it possible to provide the axial compactness of the torque converter T, while ensuring a sufficient width of the rim 16r of the output gear 16, i.e., a sufficient tooth width. The curvature radius of the roundness provided to the corner 43 of the annular recess 43 on the side of the rim 16r can be set at a large value without being interfered by the larger-diameter portion 38a of the hub 5h of the side cover 5 and hence, it is possible to avoid the concentration of a load at the corner 43a to provide an enhancement in durability of the output gear 16.

An oil supply system and a lubricating system as well as a sealing structure for the torque converter T will be described with reference to FIGS. 1 to 4.

Referring first to FIG. 1, the crankshaft 1 is provided with a oil supply passage 31 extending through an axial center portion of the crankshaft 1, and an inlet bore 26 and an outlet bore 27 extending radially from the oil supply passage 31. An orifice 32 is defined in the oil supply passage 31 between the inlet bore 26 and the outlet bore 27.

The oil supply passage 31 is connected at its one end to a discharge port in an oil pump 30 driven by the crankshaft 1 and at the other end to lubricated portion (not shown) of the engine. The inlet bore 26 communicates with the circulation circuit C through the radial needle bearing 8, a radial oil groove 44 in the partition wall 34 in the hub 4h of the stator impeller 4 and an axial oil groove 45 in the larger-diameter inner peripheral surface portion 35b (see FIGS. 10 and 11).

An annular oil sump 29 and a pair of annular constrictions 90 and 90' disposed to axially sandwich the annular oil sump 29 are provided between opposed peripheral surfaces of the crankshaft 1 and the turbine shaft 6 and between radial needle bearings 8 and 8' arranged axially. The outlet bore 27 communicates with the circulation circuit C through the annular oil sump 29, a transverse bore 28 provided in the stator shaft 7 and the radial ball bearing 10. An inner end of the radial needle bearing 11 also communicates with the transverse bore 28.

Figure 2:
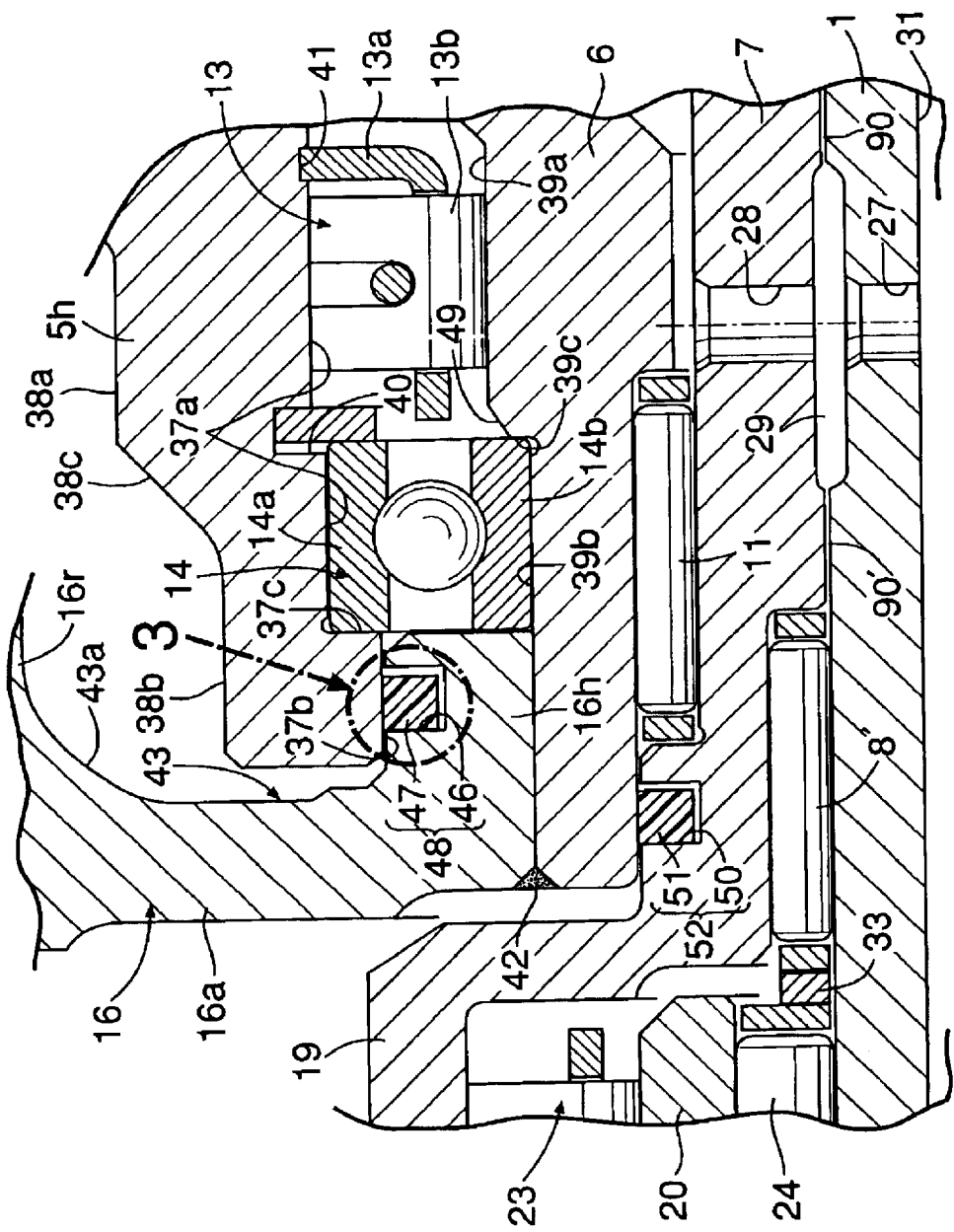
FIG. 2 is an enlarged view of an area indicated by 2 in FIG. 1.
Figure 3:
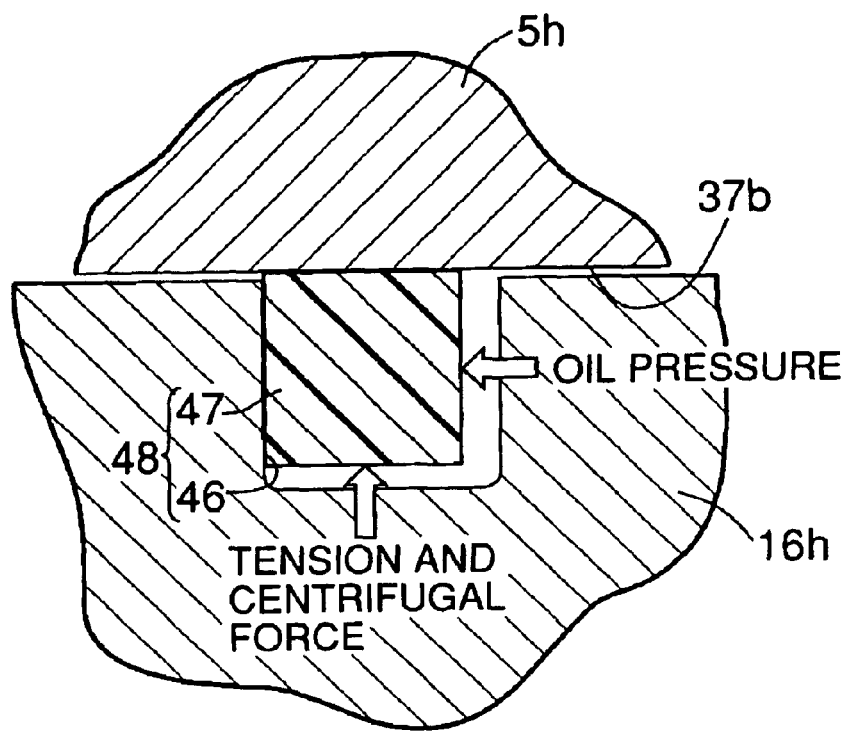
FIG. 3 is an enlarged view of an area indicated by 3 in FIG. 2.

As shown in FIG. 2, the outer peripheral surface of the hub 16h of the output gear 16 is relatively rotatably fitted to the smaller-diameter inner peripheral surface portion 37b of the hub 5h of the side cover 5. In this case, a seal ring 47 is mounted in an annular seal groove 46 defined in the outer peripheral surface of the hub 16h of the output gear 16 to come into resilient close contact with the smaller-diameter inner peripheral surface portion 37b. The first sealing means 48 is comprised of the sealing groove 46 and the seal ring 47, so that it prevents the leakage of the oil which has lubricated the radial ball bearing 14 to the outside.

Figure 4:
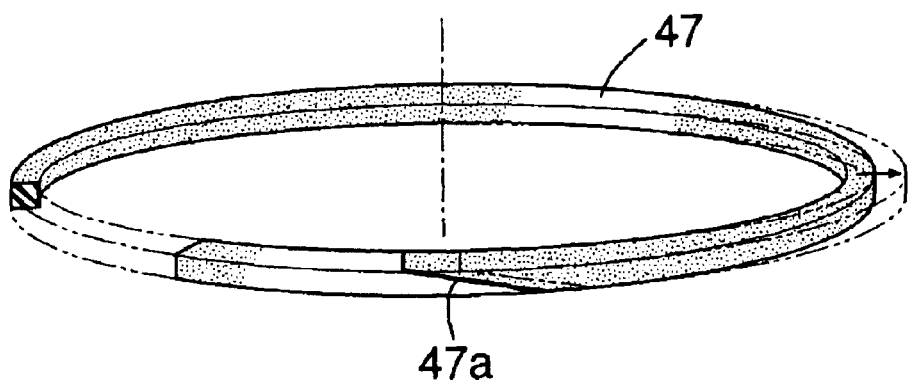
FIG. 4 is a partially cutaway perspective view of a seal ring shown in FIG. 3.
Figure 5:
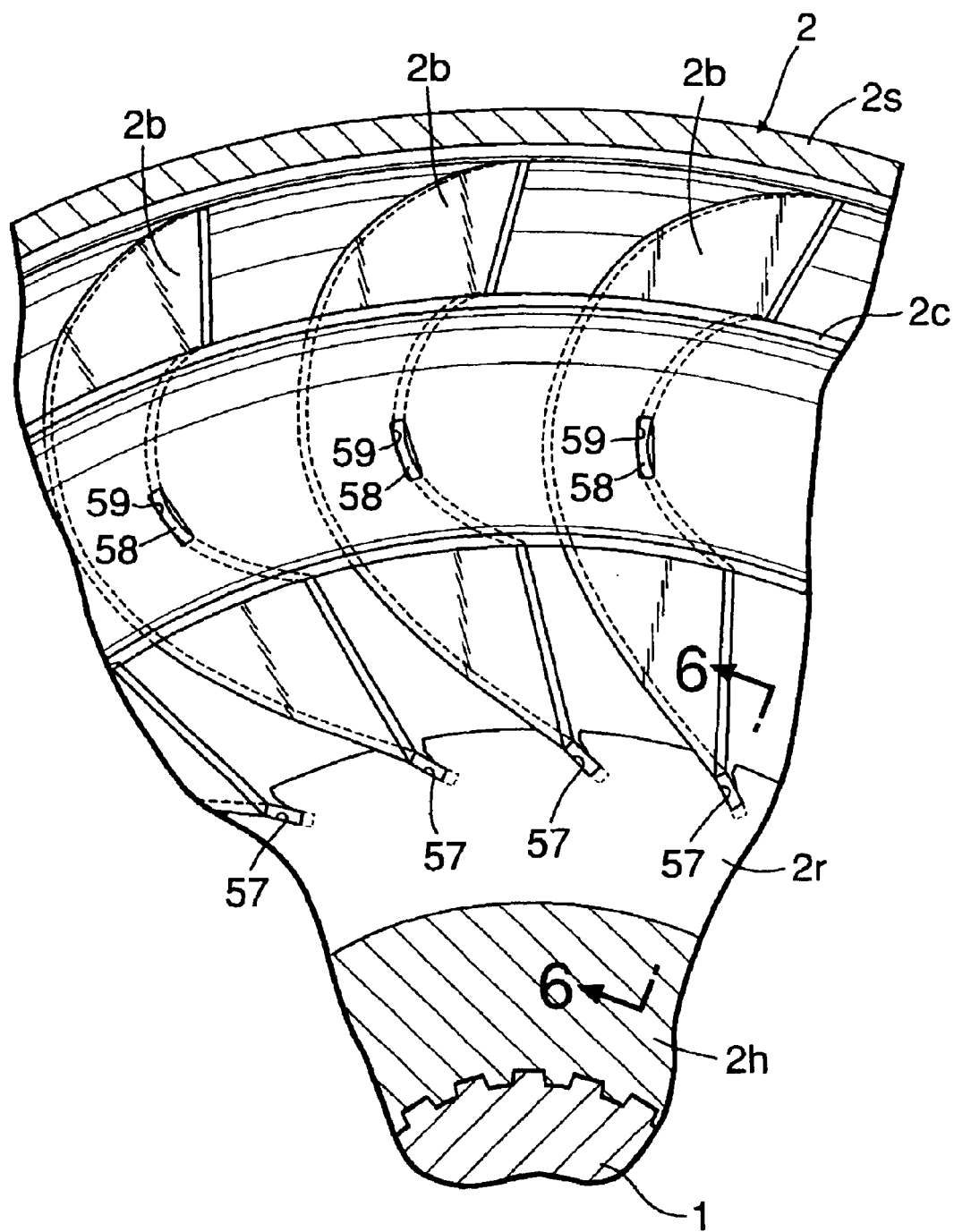
FIG. 5 is a sectional view taken along a line 5—5 in FIG. 1.
Figure 6:
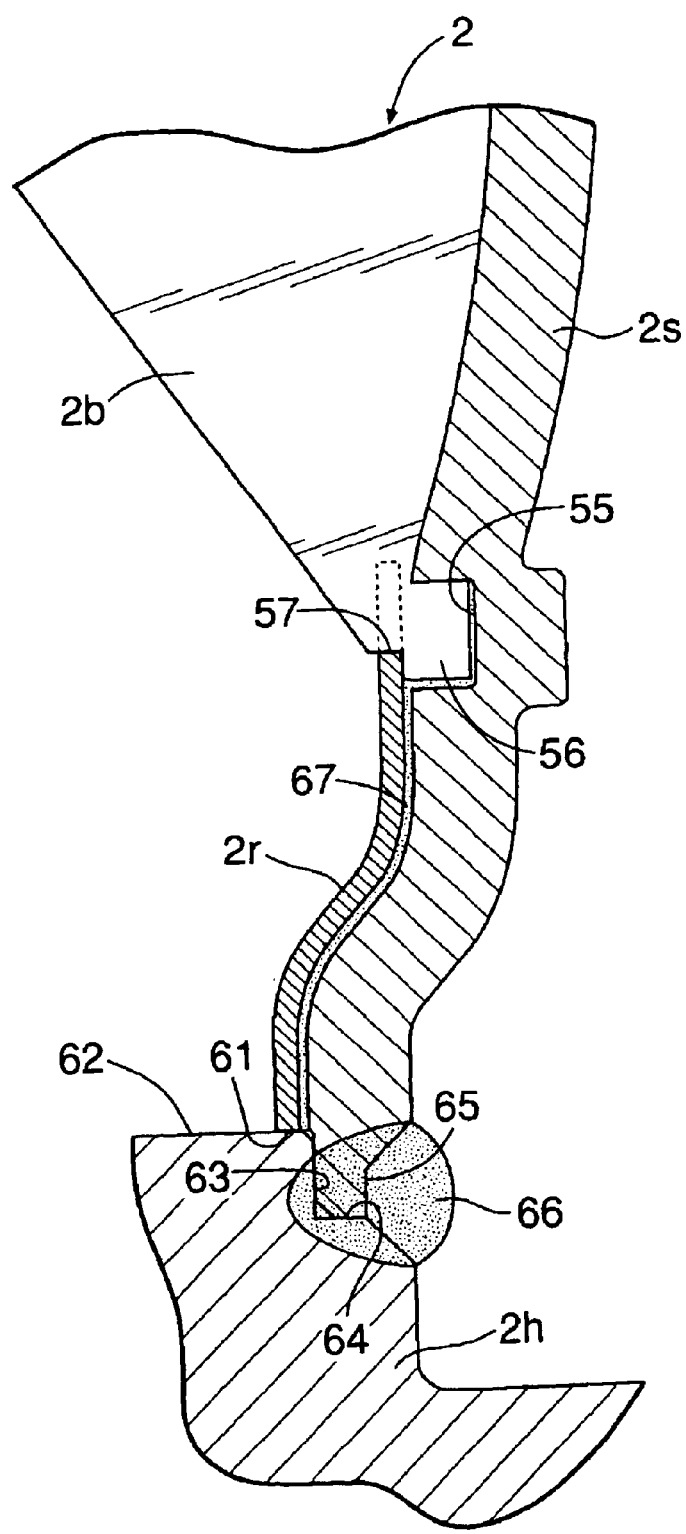
FIG. 6 is an enlarged view of an area indicated by 6 in FIG. 1.

As shown in FIG. 4, the seal ring 47 is comprised of a resilient ring member which has a single abutment 47a and which is provided with such a radial tension that it has a diameter larger than that of the smaller-diameter inner peripheral surface portion 37b of the hub 5h in its free state, with an end face facing the abutment 47a being inclined with respect to an axis or a radius line of the ring 47. To mount the seal ring 47 in the sealing groove 46, the abutment 47a is opened largely; the hub 16h of the output gear 16 is inserted into the sealing ring 47; and an opening force applied to the ring 47 is released, so that the ring 47 is mounted into the sealing groove 46 by its own restoring force.

A second sealing means 52 is mounted between opposed inner peripheral surfaces of the stator shaft 7 and the turbine shaft 6 outside the radial needle bearing 11. The second sealing means 52 is comprised, as is the first sealing means 48, of an annular sealing groove 50 defined in the outer peripheral surface of the stator shaft 7, and a seal ring 51 mounted in the sealing groove 50 to come into resilient close contact with the inner peripheral surface of the stator shaft 7, so that it prevents the leakage of the oil which has lubricated the radial needle bearing 11 to the outside.

The crankshaft 1 drives the oil pump 30 during the rotation thereof, and hence, the oil pump 30 continues to pump the oil to the oil supply passage 31. A portion of the oil is passed through the orifice 32, and the remaining portion of the oil flows through the inlet bore 26 into the circulation circuit C within the torque converter T, while lubricating the radial needle bearing 8 and the thrust plate-assembled thrust bearing 9. In this process, a portion of the working oil which has lubricated the radial needle bearing 8 can be appropriately supplied to the annular oil sump 29 through the first annular constriction 90, because the annular constriction 90 is provided between the radial needle bearing 8 and the annular oil sump 29.

The working oil passes through the radial needle bearing 10 into the circulation circuit C, fills the inside of the circulation circuit C, lubricates the radial ball bearing 10 and the radial needle bearing 11, and flows sequentially via the transverse bore 28, the annular oil sump 29 and the outlet bore 27 to a downstream portion of the oil supply passage 31, where it is joined with the oil passed through the orifice 32, and the oil mixture flows toward the lubricated portions of the engine (not shown).

A portion of the oil within the circulation circuit C passes from a clearance defined between the outer peripheries of the pump impeller 2 and the turbine impeller 3 toward the side cover 5, and is used for the lubrication of the one-way clutch 13 and the radial ball bearing 14. A portion of the oil entering the annular oil sump 29 is appropriately supplied through the first annular constriction 90 between the crankshaft 1 and the stator shaft 7 to the radial needle bearings 8' and 24 and the freewheel 23 to lubricate them.

The oil which has lubricated the one-way clutch 13 and the radial ball bearing 14 is blocked by the lightly press-fitted portions of the turbine shaft 6 and the hub 16h of the output gear 16 and the annular beam weld zone 42 formed using the laser or the like, and also blocked by the first sealing means 48 between the hubs 5h and 16h of the side cover 5 and the output gear 16, whereby such oil cannot be leaked to the outside.

Especially, because the first sealing means 48 is comprised of the annular sealing groove 46 defined in the outer peripheral surface of the hub 16h of the output gear 16, and the seal ring 47 mounted in the sealing groove 46 to come into resilient close contact with the smaller-diameter inner peripheral surface portion 37b of the hub 5h of the side cover 5, the seal ring 47 intends to expand by a centrifugal force generated by the rotation thereof along with the side cover 5, thereby increasing the close contact force to the smaller-diameter inner peripheral surface portion 37b. In addition, the oil pressure within the torque converter T urges the inner surface of the seal ring 47 to bring the ring 47 into close contact with an outer inner surface of the sealing groove 46. As a result, it is possible to effectively prevent the leakage of an internal oil pressure rising during rotation of the torque converter T at a high speed.

In addition, because the seal ring 47 is comprised of the resilient ring member which has the single abutment 47a and which is provided with the radially outward tension, the mounting of the hub 16h of the output gear 16 in the sealing groove 46 can be conducted easily and moreover, the force of close contact of the seal ring 47 with the smaller-diameter inner peripheral surface portion 37b can be increased reliably in accordance with increases in rotational speeds of the hub 5h of the side cover 5 and the output gear 16.

Further, the leakage of the working oil from the abutment 47a can be minimized by inclining the end face of the seal ring 47 facing the abutment 47a with respect to the axis or the radium line of the ring 47.

Yet further, because the inner peripheral surface of the hub 5h of the side cover 5 is formed into the stepped configuration by the larger-diameter inner peripheral surface portion 37a on the side of the base end, on which the radial ball bearing 14 and the one-way clutch 13 are mounted, and the smaller-diameter inner peripheral surface portion 37b on the side of the tip end, the entire stepped inner peripheral surface can be formed at a stroke from the side of its one end, thereby contributing to a decrease in forming steps and a reduction in cost.

Moreover, the annular step 37c between the larger-diameter inner peripheral surface portion 37a and the smaller-diameter inner peripheral surface portion 37b is utilized for axially retaining the outer race 14a of the radial ball bearing 14 and hence, the retaining structure is simple, and a further reduction in cost can be provided.

Furthermore, because the first sealing means 48 is mounted between the smaller-diameter inner peripheral surface portion 37b and the hub 16h of the output gear 16 relatively rotatably fitted to the smaller-diameter inner peripheral surface portion 37b, the diameter of the first sealing means 48 can be reduced, and a load on the first sealing means 48 can be alleviated, leading to an enhancement in durability thereof.

The second sealing means 52 interposed between the crankshaft 1 and the turbine shaft 6 can also exhibit a sealing function similar to that of the first sealing means 48 to effectively prevent the leakage of the oil which has lubricated the radial needle bearing 11 to the outside.

In the above manner, the working oil which has finished the lubrication of the radial ball bearing 14 and the radial needle bearing 11 is prevented from being leaked to the outside by the first and second sealing means 48 and 52, and hence even if the capacity of the oil pump for supplying the working oil to the circulation circuit C is not particularly increased, the lack of the working oil supplied to the circulation circuit C cannot be brought about, and the torque converter T can exhibit a desired transmitting performance.

The hub 5h of the side cover 5 comprised of the larger-diameter portion 38a on the side of the base end and the smaller-diameter portion 38b on the side of the tip end, has a rational wall thickness corresponding to the load and thus, both the reduction in weight and the strength can be satisfied.

The pump impeller 2 will be described below in detail with reference to FIGS. 1 and 5 to 7.

The pump impeller 2 is comprised of a bow-shaped annular shell 2s, a large number of blades 2b brazed to an inner surface of the shell 2s at given locations, a retainer plate 2r brazed to the inner surface of the shell 2s to retain radially inner ends of the blades 2b, a core 2c connecting intermediate portions of all the blades 2b to one another, and the hub 2h welded to an inner peripheral edge of the shell 2s. A large number of positioning recesses 55 are defined and arranged circumferentially in the shell 2s, and a positioning projection 56 formed at a radially inner end of each of the blades 2b is engaged in each of the recesses 55.

On the other hand, the retainer plate 2r is disposed so that its outer peripheral edge pushes each of the positioning projections 56 of all the blades 2b to each of the positioning recesses 55. The retainer plate 2r is provided with positioning notches 57 in which the blades 2b are engaged, respectively.

Each of the blades 2b has a positioning projection 58 formed at its edge opposed to the core 2c, and positioning bores 59 are provided in the core 2c, so that each of the positioning projections 58 is engaged in each of the positioning bores 59.

Figure 7A:
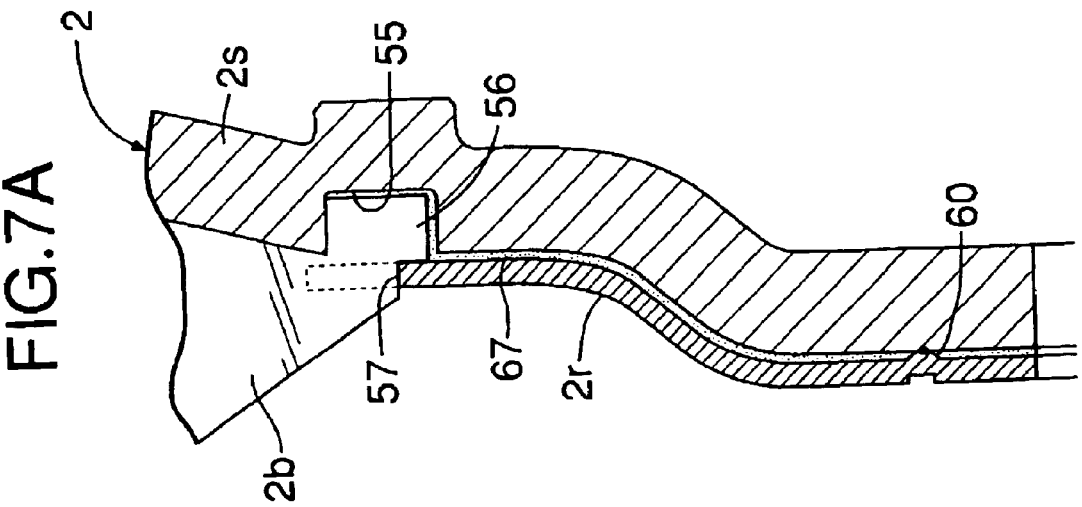
FIGS. 7A and 7B are views for explaining a process of producing a pump impeller.

To braze the blades 2b and the retainer plate 2r to the shell 2s, the blades 2b and the retainer plate 2r are first set at given locations on the shell 2s, as shown in FIG. 7A. Then, an annular or annularly arranged projection 60 bulged on one side of the retainer plate 2r at a location closer to an inner peripheral end thereof is resistance-welded to the inner surface of the shell 2s, whereby the retainer plate 2r is temporarily fixed, and in this state, the brazing is carried out. In this manner, the brazing operation can be carried out easily and precisely.

Figure 7B:
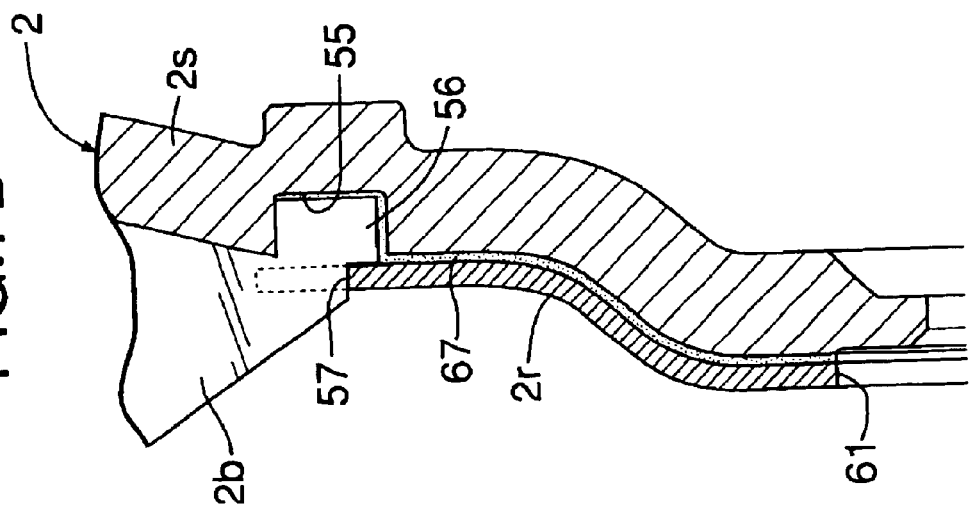

After the brazing, an inner peripheral end portion of the retainer plate 2r extending to the vicinity of the weld zone of the projection 60 is cut along with the inner surface of the shell 2s, whereby an escaping bore 61 having a diameter larger than that of the inner peripheral surface of the shell 2s is defined in the retainer plate 2r, as shown in FIG. 7B.

On the other hand, a larger-diameter portion 62 and a smaller-diameter fitting portion 64 connected to an outer end of the larger-diameter portion 62 through an annular step 63 are formed on the outer peripheral surface of the hub 2h. The larger-diameter portion 62 is inserted into the escaping bore 61 with the smaller-diameter fitting portion 64 fitted to the inner peripheral surface of the shell 2s, and the inner surface of the shell 2s is pushed against the annular step 63. An annular groove 65 trapezoidal or V-shaped in section is defined between the outer surfaces of the shell 2s and the hub 2h with a groove bottom formed by their fitted portions, and the fitted portions of the shell 2s and the hub 2h are TIG-welded or MIF-welded to each other over the entire periphery in the annular groove 65. A weld zone 66 formed at this time fills the annular groove 65 and reaches the annular step 63 of the hub 2h, against which the inner surface of the shell 2s is in abutment.

In the illustrated embodiment, the annular groove 65 is of such a trapezoidal sectional shape that its bottom surface extends from fitted faces of the hub 2h and the shell 2s toward the shell 2s. With such a construction, the groove bottom of the annular groove 65 is in proximity to the inner surface of the shell 2s in a relatively wide range, and during the welding in the annular groove 65, the weld zone 66 can be formed to reliably reach as far as the annular step 63 of the hub 2h by a relatively small heat input.

A brazing material 67 is removed reliably from the inner surface of the shell 2s exposed by the cutting conducted after the brazing, and hence even if the weld zone 66 is formed thereafter by the welding of the hub 2h and the shell 2s to reach the annular step 63 against which the inner surface of the shell 2s is in abutment, the brazing material is never molten to flow out and incorporated into the weld zone 66. Thus, the level of defectiveness of the welding can be decreased remarkably, thereby providing an enhancement in production efficiency with the easy brazing operation.

Moreover, since the weld zone 66 of the hub 2h and the shell 2s fills the annular groove 65 and reaches the annular step 63 of the hub 2h against which the inner surface of the shell 2s is in abutment, the entire inner peripheral end of the shell 2s is welded to the hub 2h and hence, the welding strength thereof can be enhanced remarkably.

The turbine impeller 3 will be described below in detail with reference to FIGS. 1, 8, 9A and 9B.

The turbine impeller 3, as is the pump impeller 2, is comprised of a bowl-shaped and annular shell 3s, a large number of blades 3b brazed to an inner surface of the shell 3s at given locations, a retainer plate 3r brazed to the inner surface of the shell 3s to retain radially inner ends of the blades 3b, a core 3c connecting intermediate portions of all the blades 3b to one another, a reinforcing plate 70 brazed to a back of the retainer plate 3r, and the turbine shaft 6 welded to the reinforcing plate 70. The thickness of the reinforcing plate 70 is set at a value larger than that of the retainer plate 3r, so that a welding heat does not melt a brazing material 67 existing among the shell 3s, the retainer plate 3r and the reinforcing plate 70.

The structures of the shell 3s, the retainer plate 3r and the core 3c are basically the same as the structures of those of the pump impeller 2 and hence, the description of them is omitted.

To braze the shell 3s, the blades 3b, the retainer plate 3r and the reinforcing plate 70 to one another, first, the blades 3b and the retainer plate 3r are disposed at given locations on the shell 3s, and the reinforcing plate 70 is superposed on the back of the retainer plate 3r, as shown in FIG. 9A. At the same time, annular or annularly arranged projections 71 and 72 formed on opposite sides of the retainer plate 3t at locations closer to its inner peripheral end are resistance-welded to sides of the shell 3s and the reinforcing plate 70, whereby the retainer plate 3r and the reinforcing plate 70 are temporarily fixed, and in this state, the brazing is carried out.

After the brazing, inner peripheral ends of the shell 3s, the retainer plate 3r and the reinforcing plate 70 are cut as far as the vicinity of the weld zones of the projections 71 and 72, whereby fitted inner peripheral surfaces 73 are formed, as shown in FIG. 9B. A tapered face 70a having a decreasing diameter toward an inner portion of the turbine impeller 3 is also formed on the outer peripheral surface of the reinforcing plate 70.

Figure 8:
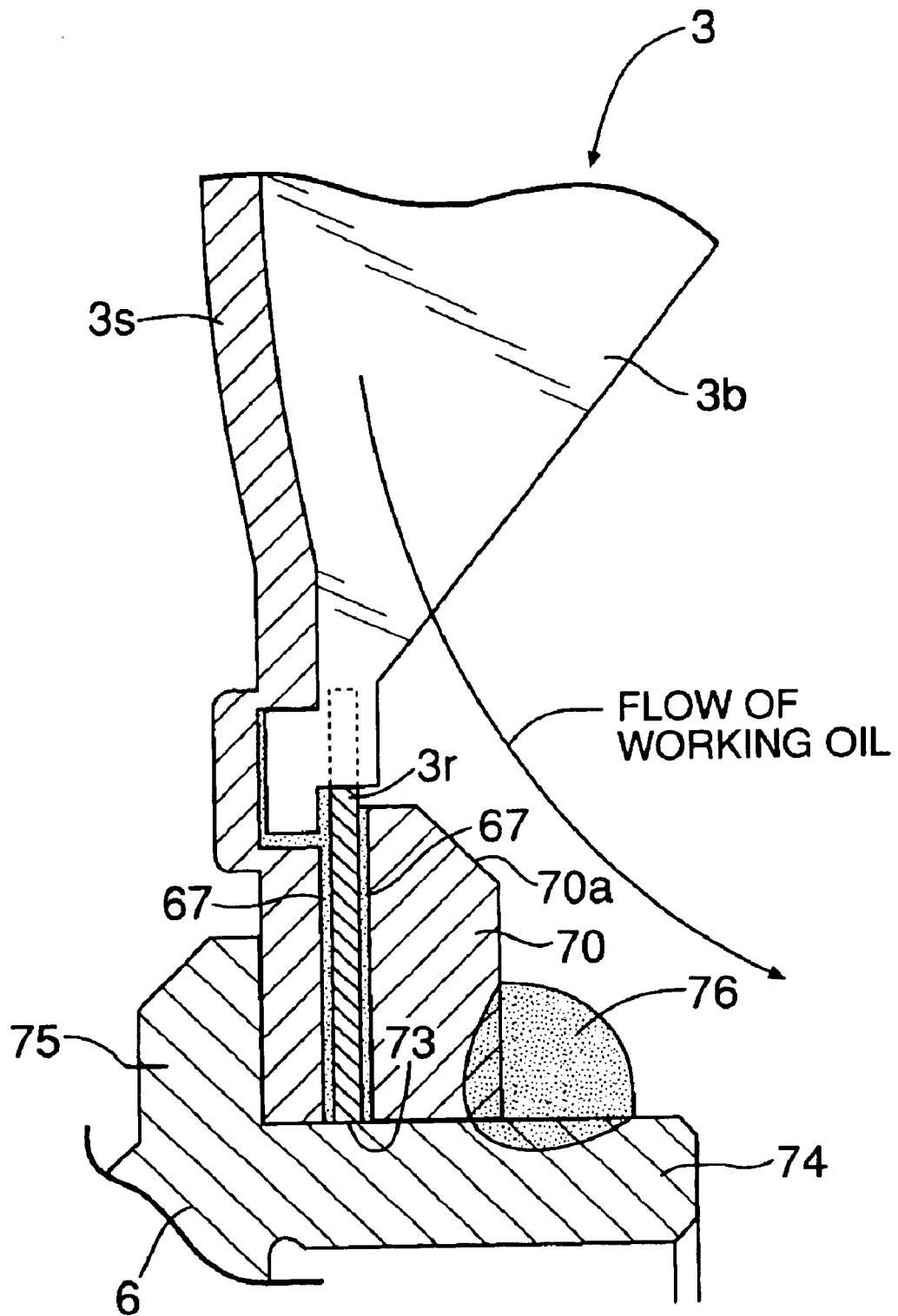
FIG. 8 is an enlarged view of an area indicated by 8 in FIG. 1.

On the other hand, as shown in FIG. 8, the inner end of the turbine shaft 6 is formed with a connecting cylindrical portion 74 which surrounds the radial ball bearing 10, and a positioning flange 75 extending radially outwards from a root of the connecting cylindrical portion 74. The connecting cylindrical portion 74 is fitted to the fitted inner peripheral faces 73, and the shell 3s is pushed against the flange 75. In this state, the connecting cylindrical portion 74 and the reinforcing plate 70 are TIG-welded or MIG-welded over the entire periphery at an inner corner between an outer peripheral surface of the connecting cylindrical portion 74 and an outer surface of the reinforcing plate 70, and as a result, a fillet 76 is formed at the inner corner by the welding.

A heat generated in the welding is absorbed by the reinforcing plate 70 having a thickness and a thermal capacity larger than those of the retainer plate 3r, and does not lead to the melting of the brazing material 67 existing among the shell 3s, the retainer plate 3r and the reinforcing plate 70. Therefore, it is possible to previously prevent the entrance of the molten-out brazing material into the weld zone between the connecting cylindrical portion 74 and the reinforcing plate 70, thereby making the good weld zone.

During operation of the torque converter T, an axially outward load is applied to the shell 3s and the turbine shaft 6 of the turbine impeller 3 due to their internal pressures, but the load on the shell 3s is supported by the positioning flange 75 of the turbine shaft 6, because the axially outward movement of the turbine shaft 6 is restrained by the ball bearing 14. Moreover, an inner peripheral edge of the shell 3s carried on the positioning flange 75 is reinforced firmly by the retainer plate 3r and the reinforcing plate 70 brazed to the inner surface thereof and hence, the bearing of the load by the weld zone between the reinforcing plate 70 and the connecting cylindrical portion 74 can be alleviated remarkably.

The tapered face 70a formed on the outer peripheral surface of the thicker reinforcing plate 70 and having a decreasing diameter toward the inner portion of the turbine impeller 3 and the fillet 76 are arranged along the flow of the working oil within the turbine impeller 3 and hence, the rectification of the working oil can be ensured to contribute to an enhancement in fluid transmission efficiency.

Figure 10:
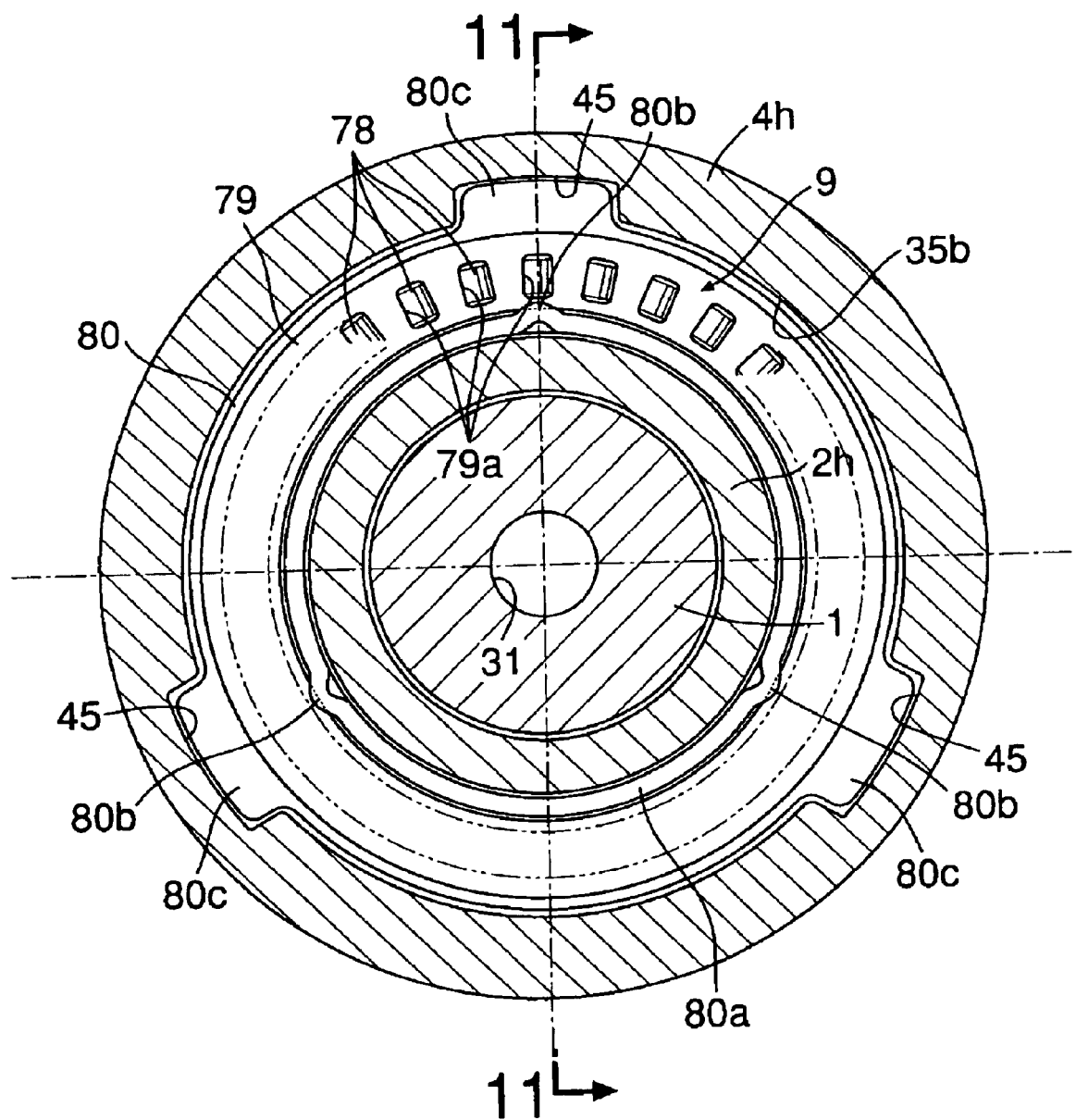
FIG. 10 is a sectional view taken along a line 10—10 in FIG. 1.
Figure 11:
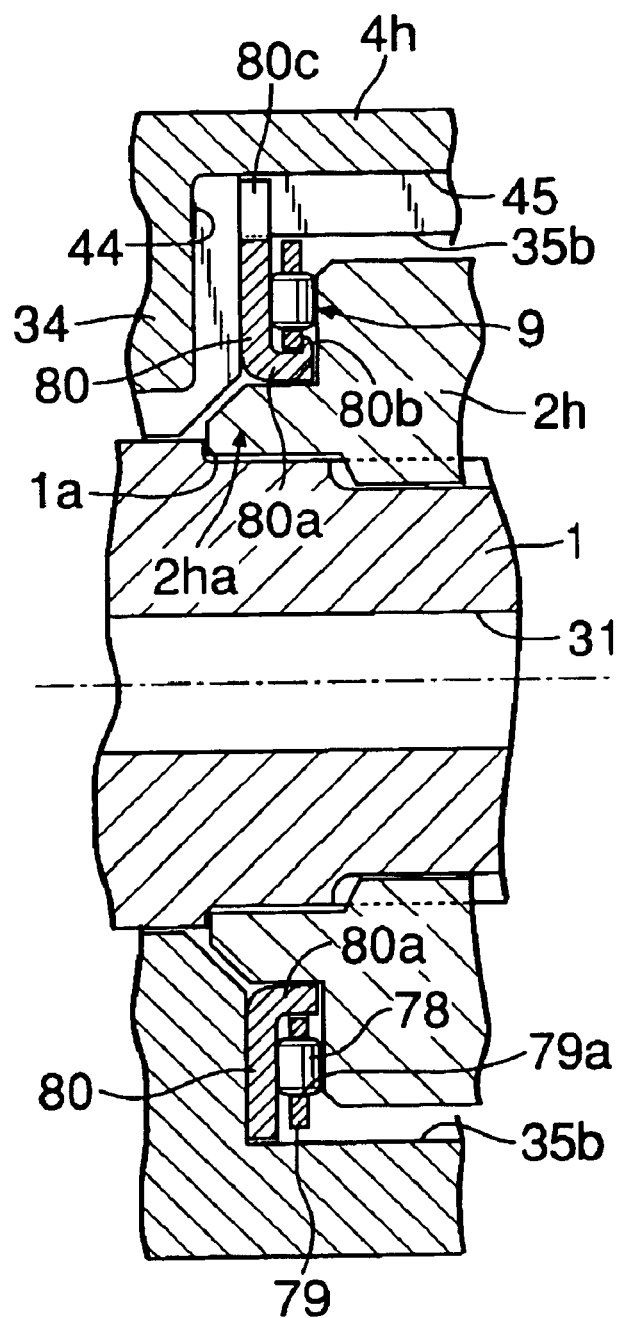
FIG. 11 is a sectional view taken along a line 11—11 in FIG. 10.

The thrust plate-assembled thrust bearing 9 interposed between both the hubs 2h and 4h of the pump impeller 2 and the stator impeller 4 will be described below in detail with reference to FIGS. 10 and 11.

The thrust plate-assembled thrust bearing 9 comprises a large number of needle rollers 78 arranged annularly with axes turned radially, an annular retainer 79 having a large number of windows 79a for retaining the needle rollers 78, and an annular thrust plate 80 made of a steel plate for supporting one side of the group of the needle rollers 78. The thrust plate 80 is integrally formed with a cylindrical portion 80a which is rotatably fitted to an inner peripheral surface of the retainer 79, and a plurality of slip-out preventing claws 80b are formed in an opposed relation to an outer surface of the retainer 79 by caulking a tip end edge of the cylindrical portion 80a radially outwards. In this manner, the thrust plate 80 is integrally assembled as one element to the thrust-assembled thrust bearing 9. A single detent piece or a plurality of detent pieces 80c is or are provided integrally and projectingly around an outer periphery of the thrust plate 80.

To mount the thrust plate-assembled thrust bearing 9 between both the hubs 2h and 4h of the pump impeller 2 and the stator impeller 4, first, the thrust plate-assembled thrust bearing 9 is inserted into the larger-diameter inner peripheral surface portion 35b of the hub 4h of the stator impeller 4, while aligning the detent piece(s) 80c with the axial oil groove 45 with the thrust plate 80 being in the lead, so that the thrust plate 80 is brought into abutment against the partition wall 34 of the hub 4h. Then, a smaller-diameter short shaft portion 2ha formed at an inner end of the hub 2h of the pump impeller 2 is fitted loosely over the cylindrical portion 80a of the bearing 9, whereby the group of the needle rollers 78 is put into abutment against an inner end face of the hub 2h.

The thrust plate-assembled thrust bearing 9 once inserted into the hub 4h of the stator impeller 4 in the above manner can be interposed properly between both the hubs 2h and 4h of the pump impeller 2 and the stator impeller 4 without dropping-out of retainer 79, leading to an extremely good assemblability, and in addition, the forgetting of the mounting of the thrust plate 80 can be prevented. Moreover, the retainer 79 and the thrust plate 80 are retained in a concentric relation to each other by the cylindrical portion 80a of the thrust plate 80 and hence, both the thrust plate 80 and the retainer 79 can be positioned concentrically with the hub 2h of the pump impeller 2 only by fitting the cylindrical portion 80a to the smaller-diameter short shaft portion 2ha of the hub 2h of the pump impeller 2, leading to a simplified positioning structure.

During relative rotation of the pump impeller 2 and the stator impeller 4, the thrust plate 80 directly receives thrust loads from the needle rollers 78, while being rotated in unison with the hub 4h of the stator impeller 4, thereby preventing the wear of the hub 4h made of the light alloy. In addition, the axial oil groove 45 serves as a detent groove corresponding to the detent piece 80c.

Figure 12:
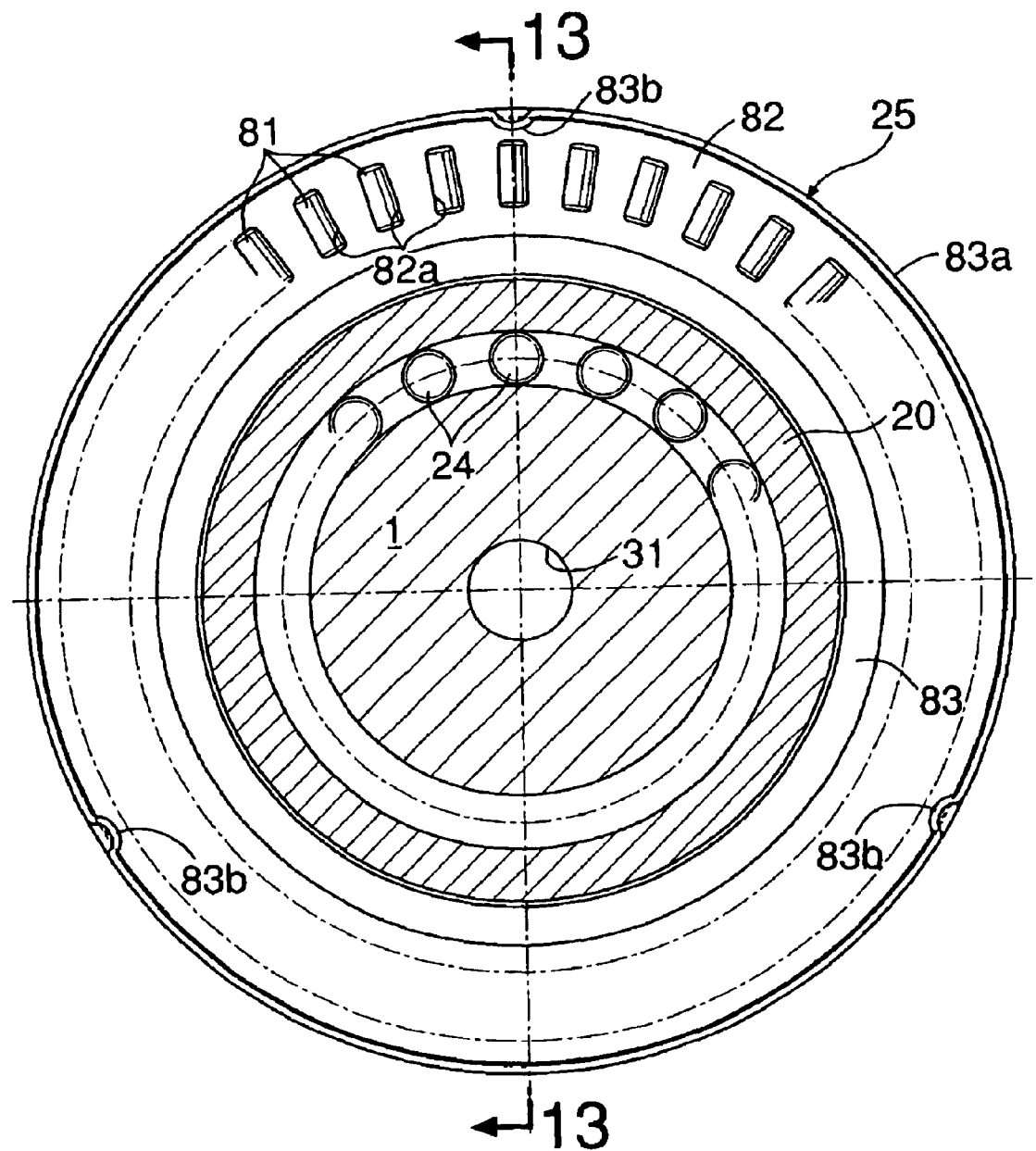
FIG. 12 is a sectional view taken along a line 12—12 in FIG. 1.
Figure 13:
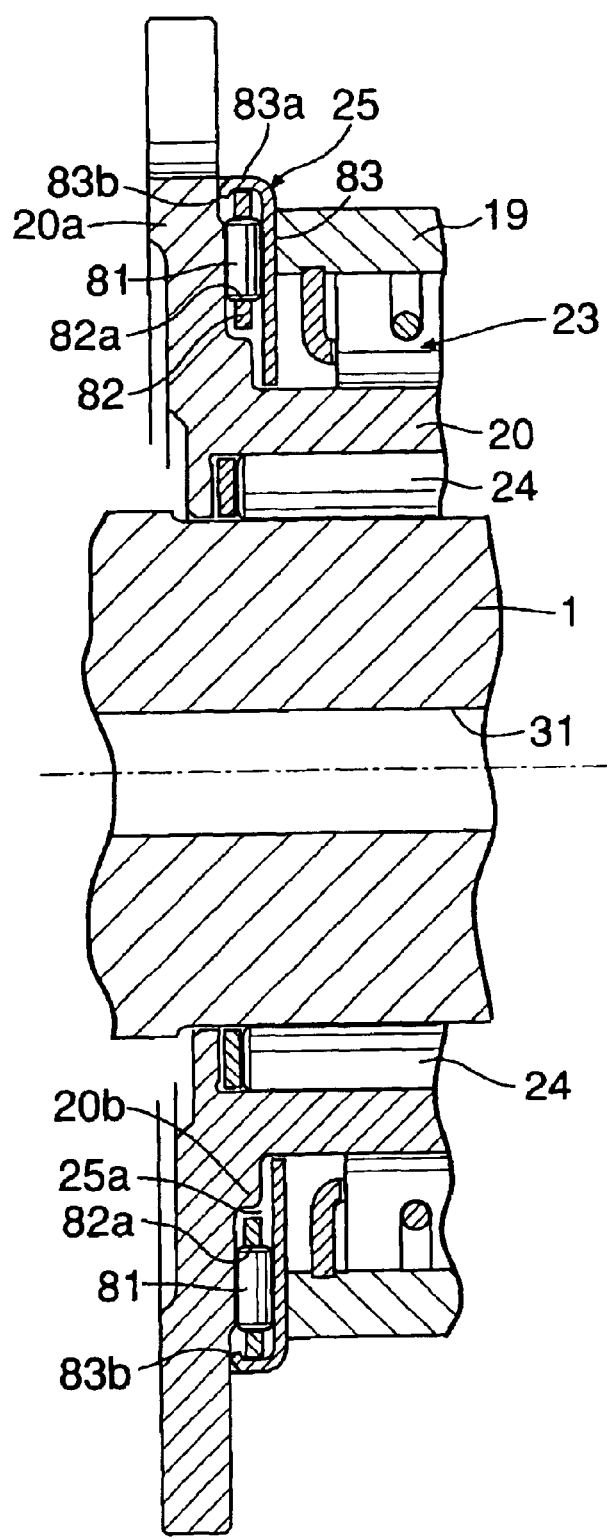
FIG. 13 is a sectional view taken along a line 13—13 in FIG. 12.

The thrust plate-assembled thrust bearing 25 interposed between the end face of the outer tube 19 on the outer periphery of the freewheel 23 and the flange 20a of the inner tube 20 on the inner periphery of the freewheel 23 will be described below in detail with reference to FIGS. 1, 12 and 13.

The thrust plate-assembled thrust bearing 25, as does the thrust plate-assembled thrust bearing 9, also comprises a large number of needle rollers 81 arranged annularly with axes turned radially, an annular retainer 82 having a large number of windows 82a for retaining the needle rollers 81, and an annular thrust plate 83 made of a steel plate for supporting one side of the group of the needle rollers 81. The thrust plate 83 is integrally formed with a cylindrical portion 83a which is rotatably fitted over an outer peripheral surface of the retainer 82, and a plurality of slip-out preventing claws 83b are formed in an opposed relation to an outer surface of the retainer 82 by caulking a tip end edge of the cylindrical portion 83a radially inwards. In this manner, the thrust plate 83 is integrally assembled as one element to the thrust-assembled thrust bearing 25.

The thrust plate 83 is formed with its inner diameter smaller than that of the retainer 82, whereby an annular step 25a is formed between the retainer 82 and the thrust plate 83, and the thrust plate 83 is adapted to be fitted loosely over the outer periphery of the inner tube 20. On the other hand, an erroneous-mounting preventing annular projection 20b is formed on a side of the flange 20a of the inner tube 20 opposed to the thrust plate-assembled thrust bearing 25, so that it is received by the step 25a.

To mount the thrust plate-assembled thrust bearing 25 correctly, first, the thrust plate 83 is fitted over the outer periphery of the inner tube 20 in such an attitude that the needle rollers 81 have been turned toward the flange 20a. Then, the retainer 82 is fitted over the outer periphery of the erroneous-mounting preventing projection 20b of the flange 20a. This enables the group of the needle rollers 81 to be put into abutment against the flange 20a at given locations, while receiving the erroneous-mounting preventing projection 20b on the step 25a between the retainer 82 and the thrust plate 83. Therefore, if the thrust plate-assembled thrust bearing 25 has been mounted to face in a direction opposite from a correct direction, the thrust plate-assembled thrust bearing 25 is brought into a state floated from the flange 20a by the interference of the thrust plate 83 with the erroneous-mounting preventing projection 20b, and thus, can be judged easily as being erroneously mounted.

After the thrust plate-assembled thrust bearing 25 has been mounted correctly to the inner tube 20, the end face of the outer tube 19 is put against the outer surface of the thrust plate 83, whereby the thrust plate-assembled thrust bearing 25 is interposed between the flange 20a and the outer tube 19. During the relative rotation of the outer tube 19 and the inner tube 20, the thrust plate 83 directly receives thrust loads from the needle rollers 81, while being rotated with the outer tube 19 abutting against the thrust plate 83, whereby the wear of the end face of the outer tube 19 having a small area can be prevented.

It will be understood that the present invention is not limited to the above-described embodiments, and various modifications in design may be made without departing from the spirit and scope of the invention defined in the claims. For example, in the resistance welding for the various portions, a spot welding using no projection can be used in place of the projection welding using the projection as in the illustrated embodiment.

What is claimed is:

1. A torque converter comprising: a pump impeller connected to an input shaft; a turbine impeller which is mounted to oppose the pump impeller and to which a turbine shaft is connected; and a side cover integrally connected to the pump impeller to cover the turbine impeller; a radial bearing for concentrically retaining a hub of the side cover and the turbine shaft as well as a one-way clutch being disposed adjacent each other between the hub of the side cover and the turbine shaft extending through the hub, the one-way clutch being adapted to connect the turbine shaft and the side cover to each other when a reverse load is applied to the turbine shaft; a hub of an output gear being coupled to an outer end of the turbine shaft; a sealing means being mounted between the hubs of the output gear and the side cover, wherein an inner peripheral surface of the hub of the side cover is formed into a stepped configuration by a larger-diameter inner peripheral surface portion located on the side of its base end and a smaller-diameter inner peripheral surface portion located on the side of its tip end and connected to the larger-diameter inner peripheral surface portion through an annular step; an outer race of the radial bearing fitted to the larger-diameter inner peripheral surface portion being clamped axially by the annular step and a retaining ring locked to the larger-diameter inner peripheral surface portion; and the hub of the output gear is relatively rotatably fitted to the smaller-diameter inner peripheral surface portion with the sealing means mounted between their fitted surfaces.

2. A torque converter according to claim 1, wherein the sealing means is comprised of an annular sealing groove defined in an outer peripheral surface of the hub of the output gear, and a seal ring mounted in the sealing groove to come into resilient close contact with the smaller-diameter inner peripheral surface portion, so that the force of close contact of the seal ring with the smaller-diameter inner peripheral surface portion is increased by a centrifugal force applied to the seal ring.

3. A torque converter according to claim 2, wherein the seal ring is comprised of a resilient ring member which has a single abutment and which is provided with such a radial tension that it has a diameter larger than that of the smaller-diameter inner peripheral surface portion in its free state, an end face of the seal ring facing the abutment being inclined with respect to an axis or a radius line of the ring.

4. A torque converter according to any of claims 1 to 3, wherein the output gear is comprised of the hub fitted to the turbine shaft and to the hub of the side cover, an arm extending radially from an outer periphery of the hub at one end thereof, and a toothed rim extending axially to overhang from an outer peripheral end of the arm toward the side cover, so that an annular recess is defined between the rim and the hub, and wherein the outer peripheral surface of the hub of the side cover is comprised of a larger-diameter portion located on the side of its base end and having a diameter substantially equal to that of the annular recess, and a smaller-diameter portion located on the side of its tip end, the smaller-diameter portion being disposed in the annular recess, the larger-diameter portion being disposed outside the annular recess, a corner of the annular recess on the side of the rim being rounded.

5. A torque converter according to claim 1, wherein the turbine shaft is lightly press-fitted into the hub of the output gear, and their fitted faces are beam-welded to each other over the entire periphery at outer end faces of the hub and the turbine shaft.

6. A torque converter according to claim 5, wherein an outer peripheral surface of the turbine shaft is formed with a larger-diameter portion located on the side of its base end, and a smaller-diameter portion connected to the larger-diameter portion through an annular step, and the one-way clutch is fitted to the larger-diameter portion, while an inner race of the radial bearing is fitted to the smaller-diameter portion and clamped axially by the annular step and the hub of the output gear fitted to the smaller-diameter portion.

7. A torque converter according to claim 6, wherein the annular step has a tapered face formed at its outer peripheral edge for guiding the fitting of the one-way clutch to the larger-diameter portion.

8. A torque converter according to claim 1, wherein a stator impeller disposed between the pump impeller and the turbine impeller is made of a light alloy; an outer peripheral surface of a sleeve made of a steel is integrally coupled to an inner peripheral surface of a hub of the stator impeller; and a hollow stator shaft relatively rotatably carried on an outer periphery of an input shaft is spline-coupled to an inner periphery of the sleeve.

9. A torque converter according to claim 8, wherein the sleeve is press-fitted to the inner peripheral surface of the hub.

10. A torque converter according to claim 9, wherein the hub of the stator impeller has a smaller-diameter inner peripheral surface portion and a larger-diameter inner peripheral surface portion formed thereon with a central partition wall interposed therebetween; the sleeve is press-fitted to the smaller-diameter inner peripheral surface portion; one side of an inner race of a ball bearing for supporting the turbine impeller on the outer periphery of the stator shaft is put into abutment against an outer end face of the sleeve; a portion of the hub of the pump impeller is disposed within the larger-diameter inner peripheral surface portion; a thrust bearing having a thrust plate is interposed between the hub and the partition wall with the thrust plate put into abutment against the partition wall; and the axial position of the stator impeller is defined by the ball bearing and the thrust bearing.

11. A torque converter according to claim 10, wherein the inner race of the ball bearing is formed to have a wall thickness larger than that of an outer race of the ball bearing, so that an area of abutment of the inner race against the sleeve is increased.

12. A torque converter according to claim 1, wherein a pair of radial needle bearings are interposed between a stator shaft connected to a stator impeller disposed between the pump impeller and the turbine impeller as well as an input shaft extending through the stator shaft, and support opposite ends of the stator shaft for rotation; a freewheel is interposed between an outer tube formed at an outer end of the stator shaft and an inner tube relatively rotatably supported on the input shaft and non-rotatably supported on a stationary structure and disposed concentrically within the outer tube; a radial needle bearing is interposed between the input shaft and the inner tube, the radial needle bearing being located adjacent the radial needle bearing located at the outer end of the stator shaft and comprising a needle roller having a diameter larger than that of the radial needle bearing located at the outer end of the stator shaft.

13. A torque converter according to claim 11, wherein a flat washer is interposed between both the radial needle bearings adjoining each other.

14. A torque converter according to claim 1, wherein a circulation circuit for a working oil is defined by the pump impeller, the turbine impeller and a stator impeller disposed between the pump impeller and the turbine impeller; a stator shaft rotatably supported on the input shaft through first and second inner periphery-side radial bearings arranged axially is connected at its inner end to the stator impeller; the turbine shaft is rotatably supported on the stator shaft with an outer-periphery side radial bearing interposed therebetween; a freewheel is interposed between an outer end of the stator shaft and a stationary structure; the input shaft is provided with an inlet bore for permitting the working oil to flow into the circulation circuit and an outlet bore for permitting the working oil to flow out of the circulation circuit; an inner end of the outer-periphery side radial bearing is in communication with the circulation circuit; and a sealing means is provided between opposed peripheral surfaces of the turbine shaft and the stator shaft axially outside the outer-periphery side radial bearing.

15. A torque converter according to claim 14, wherein the inlet bore is brought into communication with the circulation circuit through the first inner periphery-side radial bearing at the inner end of the stator shaft, and an annular oil sump and a pair of annular constrictions axially sandwiching the annular oil sump are provided between the first and second inner periphery-side radial bearings and between opposed peripheral surfaces of the input shaft and the stator shaft, the annular oil sump being in communication with the outer-periphery side radial bearing through a transverse bore provided in the stator shaft.

* * * * *